Patented July 17, 1928.

1,677,126

UNITED STATES PATENT OFFICE.

HUBERT WALTER DENNIS, OF LONDON, ENGLAND.

VALVE.

Application filed June 17, 1925, Serial No. 37,855, and in Great Britain June 30, 1924.

This invention relates to valves and while it is especially applicable to steam valves and to valves for penetrative liquids such as the lighter hydrocarbons, as well as to valves of the sluice or sliding type, is of general application to valves having rising or non-rising spindles.

The invention has among its objects to provide means for making a tight joint in event of leakage through the main stuffing box, and to permit of the re-packing of the main stuffing box when the valve is open.

According to the invention an inner or inverted stuffing box is provided, the gland ring of which is adapted to be forced outwards or upwards to compress the packing therein on the reverse rotation of the valve spindle, by which the valve or some part upon the valve spindle may press the gland ring and compress the packing to the extent required to ensure a fluid tight joint. The gland ring may be held in its inverted position to retain the packing in the stuffing box by means of screw-threaded pins or bolts, having countersunk heads, passing through the flange of the gland ring, so that thus when it is required to make a tight joint in the inner or inverted stuffing box, as when the valve is open and steam may be blowing through the main stuffing box, the valve spindle may be rotated to bring the valve into contact with pressure against the gland ring of the inner or inverted stuffing box and thus the packing therein is compressed and a fluid tight joint secured.

Thus in effect the valve spindle is packed in the use of a stuffing box that is divided so that the packing in one part which is normally subject to the pressure within the valve casing is capable of being tightened while the valve is in use, in order that the other main part can be re-packed.

The invention comprises the constructional features hereinafter described.

Two constructions of valve provided with an inner stuffing box according to the invention are illustrated, by way of example, in the accompanying drawings.

Figure 1:
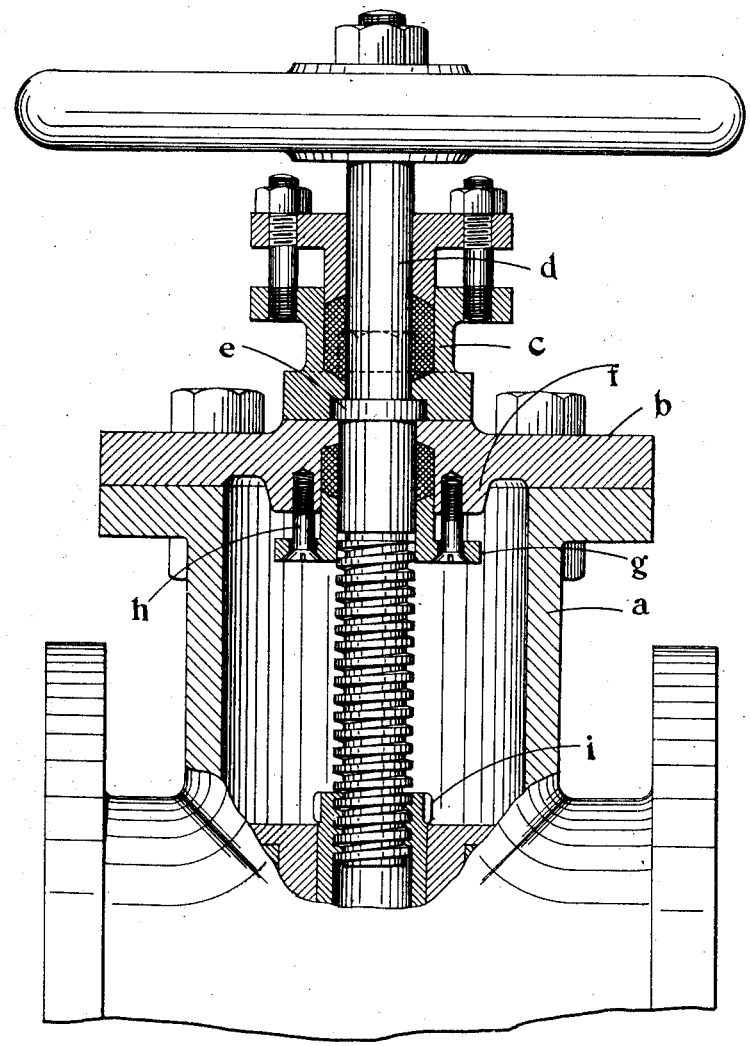
Fig. 1 is a view partly in section and partly in elevation of a stop valve of the non-rising spindle type.

In carrying the invention into effect according to one construction in its application to a stop valve of the non-rising spindle type, according to the construction illustrated in Fig. 1 of the drawings, the valve casing $a$ is provided as usual with a cover plate $b$ carrying the main stuffing box $c$, and the valve spindle $d$ has mounted thereon in determined position a collar $e$ adapted to be engaged within an annular recess provided for its reception within or beneath the stuffing box $c$ and in such manner that by means of this collar the fixity of position of the spindle $d$ is ensured. Beneath the cover plate a cavity or stuffing box $f$ is provided adapted for the reception of a gland ring $g$ which is held in position in the manner hereinbefore described by two screw-threaded pins or bolts $h$. Where the valve is, for example, of the sluice or sliding type the construction is such that the valve is adapted to be raised into such position that a boss or part $i$ upon the valve may contact with the inner or inverted gland ring in the manner hereinbefore described.

The manner in which the gland ring $g$ is held permits of the independent outward or upward movement of the gland ring in the manner described for the purpose of making a fluid tight joint, the thrust upon the spindle being taken by the collar $e$ which may be provided of any suitable form and is advantageously of double-conical form.

Figure 2:
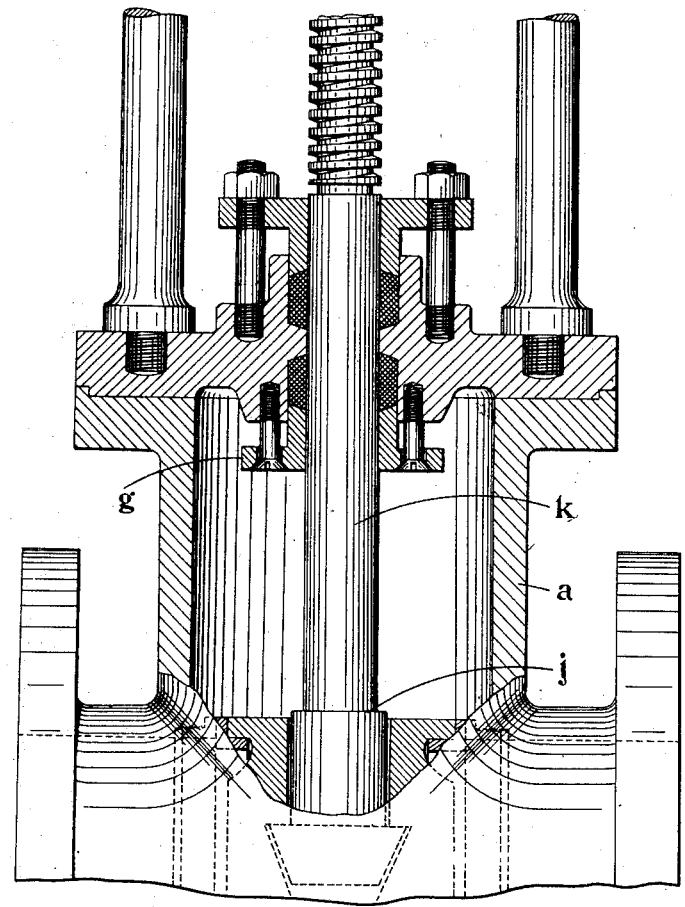
Fig. 2 is a view partly in section and partly in elevation of a stop valve of the rising spindle type.

The invention may be similarly carried into effect in its application to a stop valve of the rising spindle type, as illustrated, for example, in Fig. 2 of the drawings, in which the use of the collar as hereinbefore described is dispensed with; the upper part $j$ of the valve or some other part on the valve spindle $k$ being provided to engage with the gland ring $g$ in a similar manner for the purpose of tightly compressing the packing and making a tight joint when required on the upward movement of the valve spindle $k$.

It will be understood that by such means a deep though divided stuffing box is provided, while a fluid tight joint may always be ensured when the valve is open, by the compression of the packing within the inner or inverted stuffing box in the manner described.

I claim:

1. A valve comprising in combination, a casing, a movable valve disposed within said casing, a closure member upon and forming part of said casing, a main stuffing box disposed upon said closure member, an inverted auxiliary stuffing box disposed on the underside of said closure member and within said casing, a valve spindle passing through said closure member and through said main and auxiliary stuffing boxes, an inverted gland ring and packing forming part of said auxiliary stuffing box, means for maintaining said inverted gland ring loosely in position and for permitting the said inverted gland ring to be moved into the said auxiliary stuffing box, and means adapted in the raised position of said valve to engage said inverted gland ring to apply pressure upon the packing in said auxiliary stuffing box on said valve being fully open, substantially as described.

2. A valve comprising in combination, a casing, a movable valve disposed within said casing, a closure member upon and forming part of said casing, a main stuffing box disposed upon said closure member, an inverted stuffing box disposed on the underside of said closure member and within said casing, a rotatable valve operating screw-threaded spindle passing through said closure member and through said main and auxiliary stuffing boxes and into the said valve, means comprising a collar for preventing axial movement of said valve operating spindle means by which the said valve may be moved axially on the rotation of the said spindle, an inverted gland ring and packing forming part of said auxiliary stuffing box, means for maintaining said inverted gland ring loosely in position and for permitting the said inverted gland ring to be moved into the said auxiliary stuffing box, and means adapted in the raised position of the said valve to engage said inverted gland ring to apply pressure upon the packing in said auxiliary stuffing box on said valve being fully open, substantially as described.

3. A valve comprising in combination, a casing, having a through-way passage therein, a movable valve disposed transversely with respect to said through-way passage to control the flow of fluid therethrough, a closure member upon and forming part of said casing, a main stuffing box disposed upon said closure member, an inverted auxiliary stuffing box disposed at the underside of said closure member and within said casing, a valve operating spindle passing through said closure member and through said main and auxiliary stuffing boxes and adapted on its movement to cause the movement of said valve, an inverted gland ring and packing forming part of said auxiliary stuffing box, means for maintaining said inverted gland ring loosely in position, and for permitting the said inverted gland ring to be moved into the said auxiliary stuffing box, and means adapted in the raised position of the said valve to engage said inverted gland ring to apply pressure upon the packing in said auxiliary stuffing box on said valve being fully open, substantially as described.

HUBERT WALTER DENNIS.